US00RE35530E

United States Patent [19]

Hunt

[11] E Patent Number: Re. 35,530

[45] Reissued Date of Patent: Jun. 10, 1997

[54] BELT AND DRIVE FOR CONVERSION PRESS

[75] Inventor: George D. Hunt, Kettering, Ohio

[73] Assignee: Dayton Reliable Tool & Mfg. Company, Dayton, Ohio

[21] Appl. No.: 317,221

[22] Filed: Oct. 3, 1994

Related U.S. Patent Documents

Reissue of:

[64] Patent No.: 5,158,410
Issued: Oct. 27, 1992
Appl. No.: 884,605
Filed: May 15, 1992

U.S. Applications:

[63] Continuation of Ser. No. 561,966, Jul. 26, 1990, abandoned.

[51] Int. Cl.[6] ..... B65G 15/58

[52] U.S. Cl. ..... 413/56; 198/803.15; 72/361

[58] Field of Search ..... 72/361, 346, 422; 198/803.13, 803.14, 803.15, 834, 846; 413/35, 45, 56, 52, 62

[56] References Cited

U.S. PATENT DOCUMENTS

| | | | |
|---|---|---|---|
| 1,906,147 | 4/1933 | Gardiner | 198/846 |
| 3,917,092 | 11/1975 | McGinnis | 198/834 |
| 4,213,324 | 7/1980 | Kelley | 72/405 |
| 4,546,873 | 10/1985 | Debenham | 198/836 |
| 4,568,230 | 2/1986 | Brown | 413/14 |
| 4,723,882 | 2/1988 | Wissman | 413/62 |
| 4,860,569 | 8/1989 | Herdzina | 72/361 |
| 4,903,521 | 2/1990 | Bulso | 72/336 |
| 4,932,822 | 6/1990 | De Silva | 413/66 |
| 4,946,028 | 8/1990 | Eichmann | 198/689.1 |

FOREIGN PATENT DOCUMENTS

| | | | |
|---|---|---|---|
| 1058019 | 5/1959 | Switzerland | 198/834 |

*Primary Examiner*—Jack W. Lavinder
*Attorney, Agent, or Firm*—Wood, Herron & Evans, L.L.P.

[57] ABSTRACT

A conveyor belt and drive structure are disclosed for use with a conversion press in which an upper level of an endless conveyor belt is positioned between upper and lower tooling in the press. The conveyor belt includes a plurality of transversely and longitudinally spaced shell-receiving carrier apertures. The shell-receiving apertures are arranged in longitudinally oriented offset lanes lengthwise of the belt for receiving and conveying shells between the tooling of the press. The conveyor belt is driven in stepped fashion by a drive drum having a plurality of circumferentially spaced outwardly extending pins and the conveyor belt is provided with pin receiving holes for engagement by the drive pins. The pin receiving holes are arranged in lanes parallel to the lanes of carrier apertures, either outside of or between those lanes, and the drive holes are spaced from each other a distance at least twice the longitudinal spacing between adjacent carrier apertures. This provides an optimum number of drive holes and places them in the approximate center of regions of the belt where the drive holes are surrounded by the greatest possible width of material.

54 Claims, 6 Drawing Sheets

IA
IB
IC
ID
IIA
IIB
IIC
IID
IIIA
IIIB
IIIC
IIID
17°
17°
40
40
40
40
32
32
26

BELT AND DRIVE FOR CONVERSION PRESS

Matter enclosed in heavy brackets [ ] appears in the original patent but forms no part of this reissue specification; matter printed in italics indicates the additions made by reissue.

RELATED APPLICATION

This application is a continuation of application Ser. No. 561,966 filed Jul. 26, [1900] *1990*, and now abandoned.

BACKGROUND OF THE INVENTION

This invention relates to a mechanical press used to convert shells into ends for self-opening cans and the like and, more particularly, to a belt and belt drive for conveying the shells through such a conversion press.

Soft drinks, beer, juices and the like, are typically packaged in cans formed from aluminum or coated steel. The can body is manufactured by several known methods to include sidewalls, a bottom, a top neck to which an end is attached after the body is filled. The upper end or top, which may include means by which the can is later opened, is of course manufactured separately. These so-called self-opening or "pop top" ends are made from a shell (the principal component of the end) which is subsequently converted to an end by appropriate scoring and attachment of a tab by known integral riveting techniques in another press.

U.S. Pat. No. 4,568,230, assigned to the assignee of this application, discloses a typical conversion press for scoring shells and attaching tabs thereto. This press includes a conveyor belt which extends from one side of the press to the other through in-line conversion tooling. Cooperating with the conveyor are upstacker and downstacker mechanisms located on either side of the slide, to supply shells to and remove shells from the conveyor belt. In some applications upstackers may not be used, rather the ends may be discharged from the end of the conveyor belt. The shells are received in circular apertures in the conveyor belt, which is moved stepwise through the press in synchronism with the opening and closing of the tooling.

As shown in FIGS. 3, 6 and 10 of U.S. Pat. No. 4,568,230, a strip for forming tabs to be attached to the shells is conveyed across the path of the shells in the conveyor belt. The tab strip is conveyed through the press in a generally front to rear direction and tabs are formed in the tab strip as it is conveyed through tab forming stations within the press, while the shells are conveyed simultaneously to successive tooling stations where various forming and scoring operations are performed. The tab strip and shells meet at a tab attachment station where the completed tabs are transferred from the tab strip to the shells to form completed can ends.

In commercial versions of conversion presses of the type shown in said U.S. Patent a stainless steel conveyor belt has been used, and has been provided with a plurality of rectangular sprocket holes extending in a longitudinal direction along either edge of the conveyor belt. In presses for conversion of beer/beverage can ends, three lanes of shell-receiving apertures or pockets are provided, with the pockets in each lane offset lengthwise of the belt from those pockets in the adjacent lane. This spatial relationship is dictated by the geometry of the several lanes of tooling in the press, it being understood that the center-to-center distance along each lane between the pockets is the same, and equals the distance the conveyor belt must advance between successive closures of the tooling, to locate the shells concentrically between the successive tooling stations. In presses for conversion of larger ends, as for food cans, there may be only two lanes, with the pockets alternating lengthwise of the conveyor belt, and the incremental movement of the belt will be correspondingly greater.

A drive drum supporting the conveyor belt at one end thereof has been provided with a plurality of generally rectangular sprocket teeth for engaging in like shaped sprocket holes formed along the edges of the belt, thereby to provide positive engagement between the drive drum and the belt for accurately displacing the shells in their intermittent movement through the press. In a typical such conveyor belt arrangement (for beer/beverage can ends), the belt is 10 inches wide, and sprocket teeth have a 0.5 inch (1.27 cm) on center spacing and the shell receiving apertures or pockets have a 3 inch (7.62 cm) on center spacing in the longitudinal direction such that approximately six sprocket teeth are provided for every two shell receiving apertures on the conveyor belt.

Conversion presses of this type will have design speeds in the order of 400 to 600 strokes/minute, sometimes even higher. The power for the conveyor drive is usually derived via a power take-off mechanism from the main press drive, wherein one revolution of the main drive is translated into a single stroke of the press tooling. This mechanism is commonly called an "intermitter." To avoid interference between conveyor belt motion and the closing-opening action of the tooling, indexing (incremental advancing) of the conveyor belt is generally confined to about 210 degrees of crankshaft rotation, leaving a dwell of 150 degrees in the conveyor drive, divided around bottom dead center of crank rotation. In a typical beer/beverage conversion press with center-to-center belt aperture spacing of 3 inches (76.2 mm.), this of course equals the length of the indexing motion of the conveyor belt. Thus, at a press speed of 600 rev./min. the complete indexing motion must occur in approximately .06 seconds.

A similar conversion press for manufacturing ends for food cans presents the same situation on a somewhat different scale. The shells have a center-to-center spacing in the order of 3.5 inches (as mentioned), thus the belt indexing mechanism is set to increment that distance. A press with this arrangement typically has a design operating speed in the order of 450 rev./min.

It follows that the forces required to accelerate and decelerate the conveyor system are substantial, and there is considerable stress in the belt at the edges of sprocket holes, at a time when the belt is flexing as it wraps around the drive cylinder.

As a result of these forces being transmitted from the sprocket teeth on the drive drum to the edges of the rectangular sprocket holes in the conveyor belt, these conveyor belts have been subject to stress failures, e.g. cracking occurring at the location of the sprocket holes. When such a failure occurs in a conveyor belt, the press must stop, the belt is cut and removed from the press, then a new belt installed and then welded (in the case of the steel belt) into an endless loop, and the belt drive tightened.

Thus, there is a need for a conveyor belt design for use with a conversion press in which the stresses applied at the drive holes on the belt are minimized. There is also a need for a conveyor belt design in which the drive pins or teeth on the drive drum cooperate with a portion of the conveyor belt which has a high resistance to stress failures, such that the useful life of the conveyor belt is lengthened.

SUMMARY OF THE INVENTION

The present invention provides a conveyor belt and conveyor drive system for use with a conversion press as generally described above, in which an upper level of an endless conveyor belt is positioned between upper and lower tooling in the press, and has a plurality of transversely and longitudinally spaced shell-receiving carrier apertures or pockets which carry shells from station to station of the tooling, stopping progressively between the sequence of tooling stations.

In a preferred embodiment of the invention, an intermittently rotated drive drum is provided having a plurality of circumferentially spaced radially extending pins. The conveyor belt is preferably provided with two or more columns or lanes of staggered shell-receiving apertures extending along the length of the belt and two or more columns or lanes of drive pin receiving holes are provided. These holes are strategically located such that they are in areas of the belt where the holes are surrounded with a substantial width of the belt material. Furthermore, these drive pin holes are located so no two of them lie on a line transverse of the belt, and only a minimum number of such holes are provided to assure the needed force transmission and to have a continuous engagement of at least two pins on the drive drum with one hole in each side of the conveyor belt.

The center-to-center spacing between adjacent holes of each column of pin-receiving drive holes in the conveyor belt is at least as great as the center-to-center spacing between adjacent ones of the carrier apertures in the longitudinal direction of the conveyor belt, and preferably these holes are spaced at least twice the center-to-center distance between adjacent carrier apertures.

The lanes of carrier apertures in the belt have their centers staggered cross-wise of the belt, in accordance with the station placement of the tooling. The drive holes, arranged in two columns or rows in the conveyor belt, are likewise staggered relative to one another such that these holes are aligned with each other along an oblique line, i.e. a line which extends across the belt at an angle to a transverse line (extending at 90 degrees to the longitudinal center line and path of motion). This locates the centers of the apertures along a line having the same oblique angle to a normal line transverse of the belt, and the drive holes are thus strategically located in areas where there is a maximum of material around them. This minimizes the creation of higher stress points in the belt, particularly adjacent the drive holes.

The pins on the drive drum are located in first and second circumferentially oriented rows, spaced from each other along the rotational axis of the drum a distance equal to the spacing between the columns of drive holes on the conveyor belt. The pins in the first row are angularly displaced about the circumference of the drive drum relative to the pins in the second row such that the pins in the first and second rows are aligned transversely across the face of the drive drum at an oblique angle relative to the rotational axis of the drum, matching the array of the drive holes. Each of the circumferential rows of pins preferably includes a maximum of four pins, angularly displaced by 90° around the drum circumference. Further, each of the pins in the first row is angularly displaced from corresponding pins in the second row by a helix angle of less than 45°, preferably a helix angle in the order of 15°.

The end of the conveyor belt opposite from the drive drum wraps around a follower drum which is supported for free rotation with movement of the belt. The follower drum includes a central circumferential belt support surface and drum end caps forming a radially extending edge along either end of the follower drum for positioning the conveyor belt on the drum support surface.

Accordingly, the principal object of the invention is to provide a belt conveyor drive system for a can end conversion press, or the like, which will have an extended life so as to minimize press down time to replace a damaged conveyor belt; to provide such a system which is particularly directed to an improved arrangement using a thin flexible metal conveyor belt which is formed of an endless loop of stainless steel or the like, and in which drive holes are strategically placed in the belt at regions where there is the greatest possible width of material surrounding such drive holes; to provide such a system wherein the number of such drive holes and their location relative to each other and to the carrying apertures through the belt is optimized to achieve accurate high speed indexing type drive of the belt while minimizing potential stress points in the belt, particularly as it flexes in turning around the drive and idler drums which define its path of motion.

Other objects and advantages of the invention will be apparent from the following description, the accompanying drawings and the appended claims.

DETAILED DESCRIPTION OF THE PREFERRED EMBODIMENT

Figure 1:
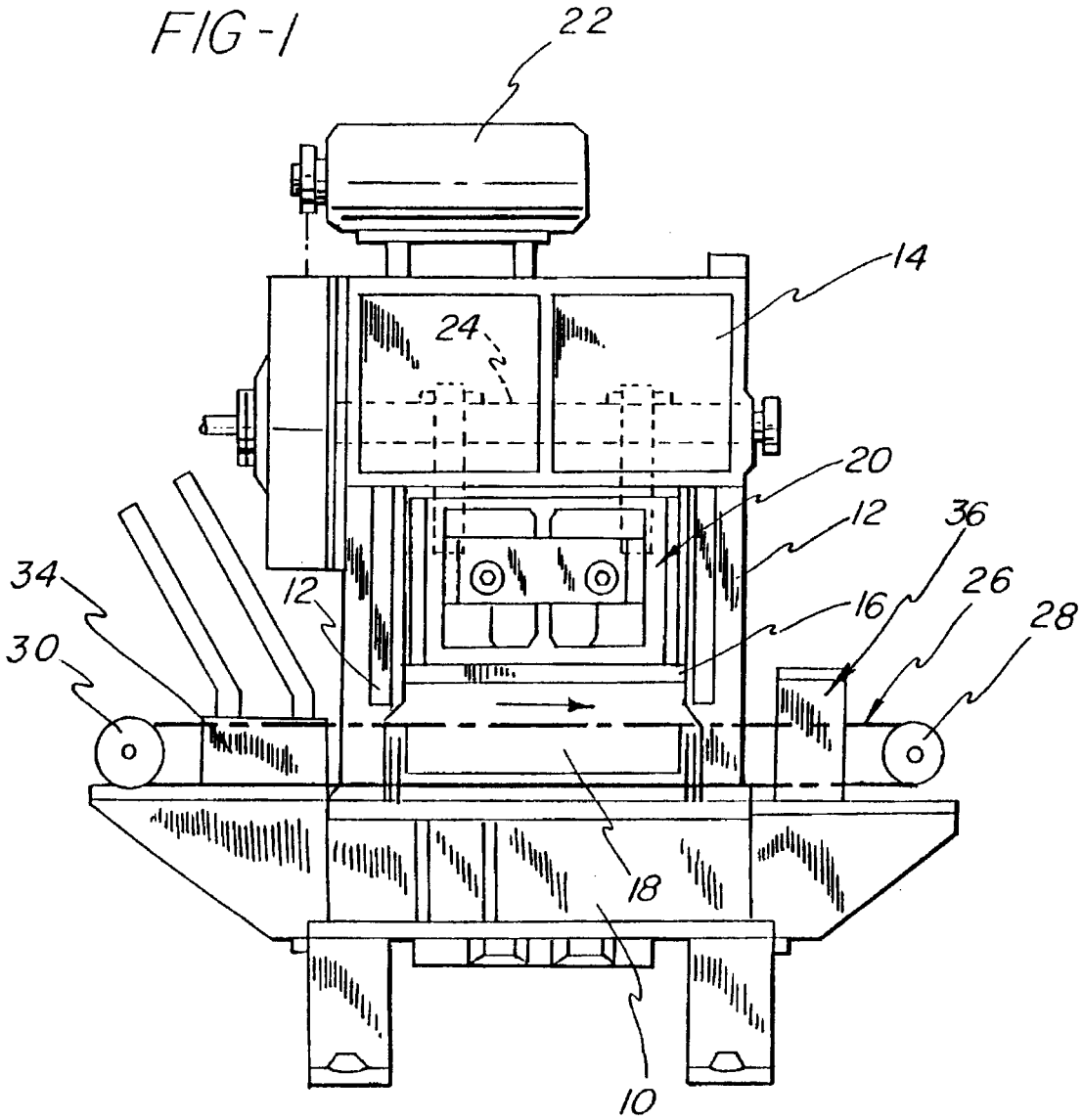
FIG. 1 is a front overall view of a press using the conveyor belt and drive system of the present invention.

The outline and lay-out of a typical press in which the conveyor belt and drive system of the present invention may be used is shown in FIG. 1 and may be a typical 125 ton single acting press such as the Minster ECH-H44-QL Press, manufactured by Minster Machine Company of Minster, Oh. The press includes a bed 10, uprights 12 and a crown 14 supported on the uprights 12. An upper tooling set, indicated by the general reference numeral 16, is mounted on a press slide 20 which is supported from the crown 14 for reciprocating movement toward and away from a lower tooling set, indicated by the general reference numeral 18, supported on the bed 10. A motor 22 is supported on the top of the crown 14 for driving the slide 20 in its reciprocating motion through a crank 24 in a well known manner substantially as disclosed in commonly assigned U.S. Pat. No. 4,568,230, the disclosure of which is incorporated herein by reference.

The press further includes a conveyor belt 26 which is preferably formed as an endless belt of relatively flexible material such as thin stainless steel. The conveyor belt 26 is driven by a drive drum 28 located on one side of the press and is supported at an opposite end of the belt 26 by an idler or follower drum 30. The drive drum 28 is connected to the crank 24 through a standard intermittent drive mechanism (not shown) such that belt 26 is intermittently advanced in steps synchronized with the movement of the slide 20, in a manner such as that disclosed in U.S. Pat. No. 4,568,230.

Figure 2:
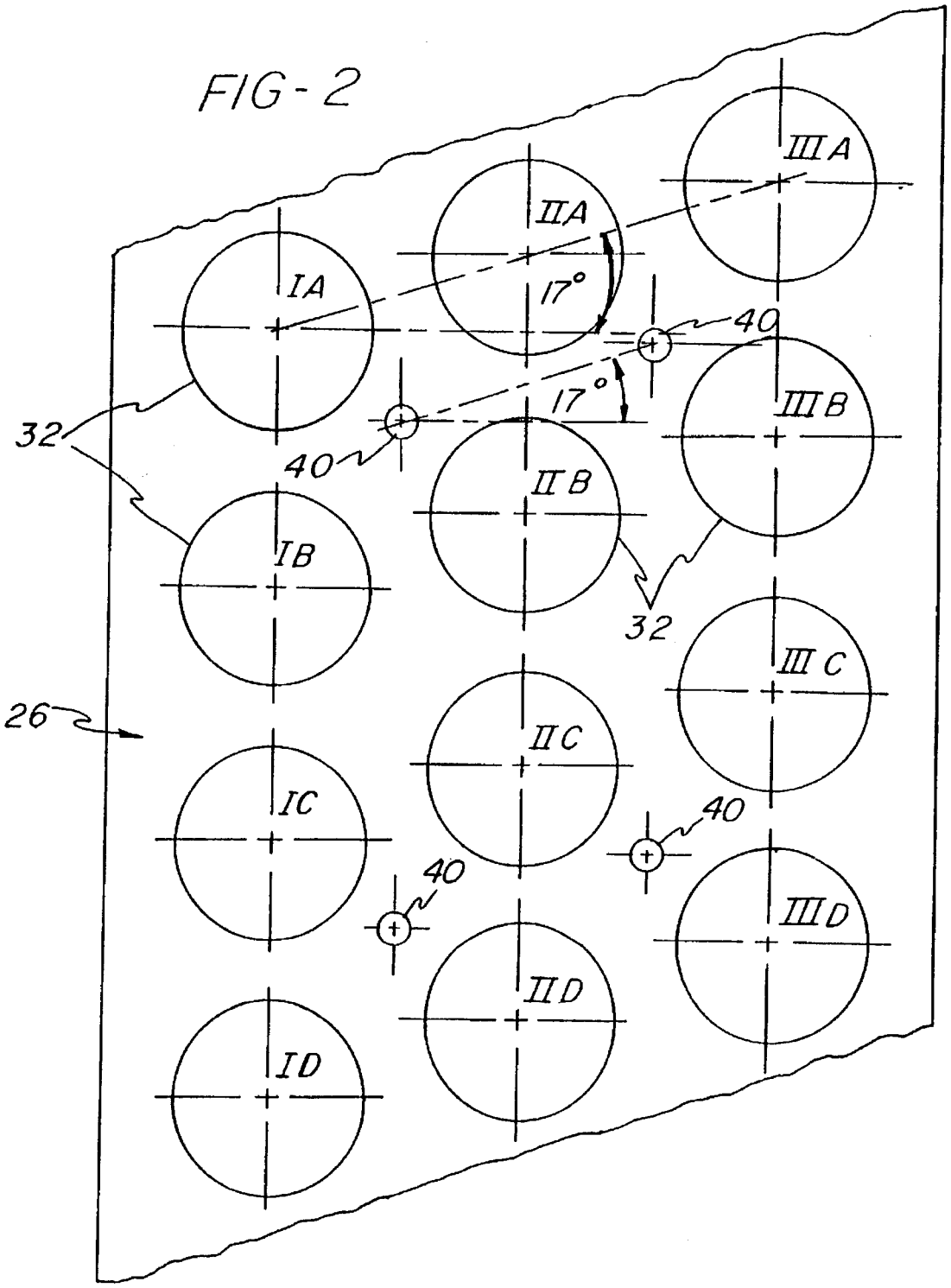
FIG. 2 is a plan view of a section of the conveyor belt of the present invention.

As seen in FIG. 2, the belt 26 is provided with a plurality of substantially circular apertures or pockets 32 for receiving and carrying shells through the press. The apertures 32 are of such a diameter that the lip portion of a shell located therein overhangs the edge defining the aperture opening. The apertures 32 are arranged along the belt in longitudinally extending lanes (for example three lanes are shown in FIG. 2), designated as I, II and III.

As belt 26 is intermittently advanced through the press, shells are loaded onto the conveyor belt 26 by a downstacker indicated by reference numeral 34 and the converted ends may be removed from the conveyor belt 26 by an upstacker indicated by reference numeral 36 at an opposite side of the press. Optionally, the upstacker may be eliminated, and the ends dropped off the end of belt 26 onto a conveyor or the like as the belt passes around drive drum 28. The downstacker 34 and upstacker 36 may be similar in structure and operation to the loading and unloading mechanisms shown in FIGS. 13 through 18 of U.S. Pat. No. 4,568,230.

The upper and lower tooling 16, 18 are provided for forming and scoring the shells and attaching tabs to the shells as they pass between the bed 10 and slide 20 of the press. In addition, tooling is usually provided within the press for forming tabs for attachment to the shells from a strip of stock material passing in a front to rear direction through the press, transverse to the longitudinal direction of the conveyor belt 26. A full description of the necessary tooling for forming the scoring on the shells, and for producing and attaching the tabs to the shells, may be found in the above referenced U.S. Pat. No. 4,568,230. It should be noted that although the tooling disclosed therein is designed to operate on only two longitudinally extending lanes of shells carried by the conveyor belt (as is the embodiment later described herein), the provision of additional tooling to operate in cooperation with a conveyor belt having more than two lanes of shell apertures, as described further below, is within the present level of skill of the artisan in the can end making art, and in reality depends on the capacity of the press, the size of the ends to be converted, and the opening tab application.

Referring to FIG. 2 in which a section of a three lane belt is shown in plan view, it can be seen that the apertures 32 are arranged in regularly spaced relationship within lanes designated I, II and III, and the lanes are regularly spaced from each other in the transverse direction of the belt 26. The center-to-center spacing of apertures along the lanes equals the center-to-center distance of the progressive tooling stations, thus one increment of belt motion moves a shell from one tooling station to the next in a stepping motion.

Figure 6:
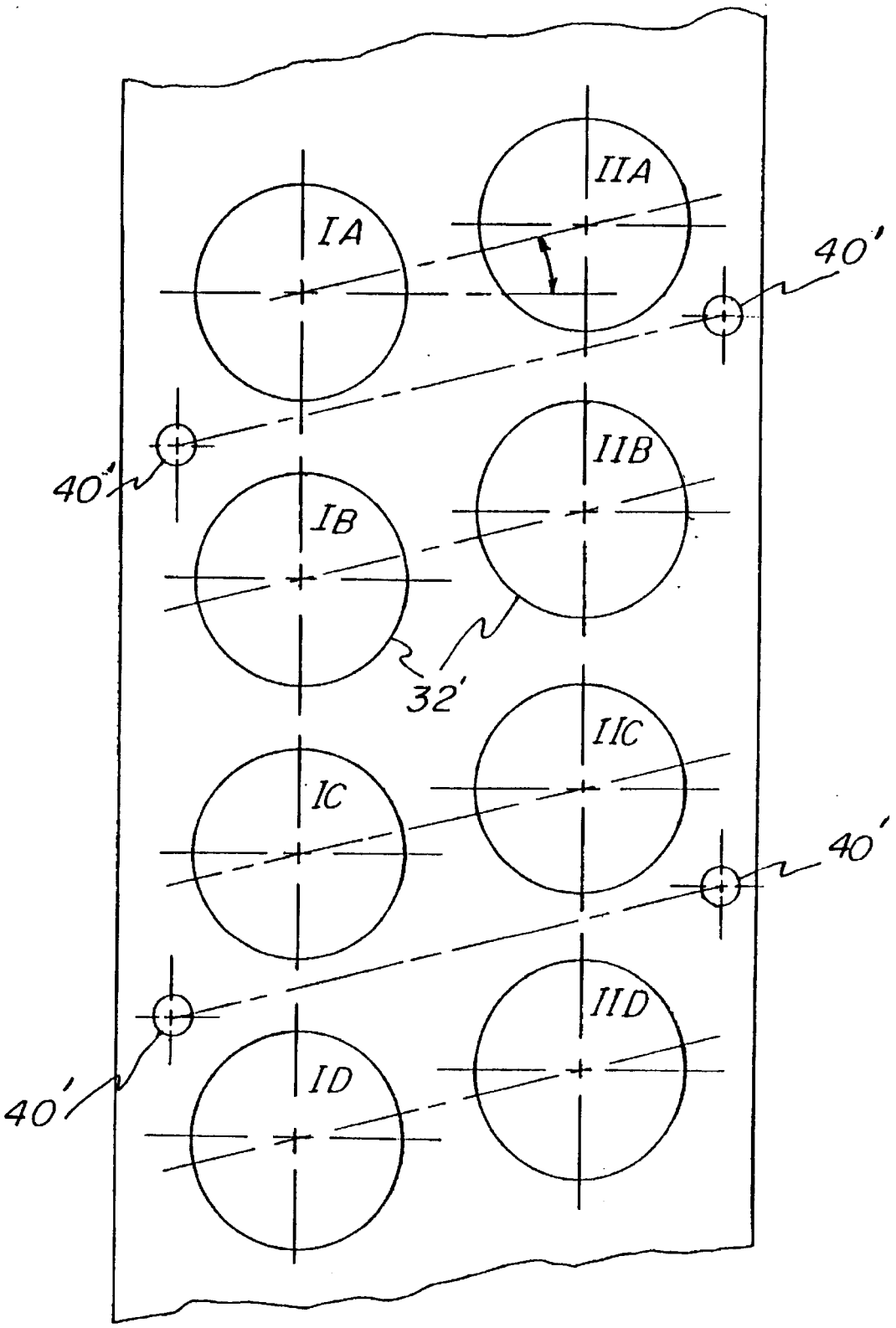
FIG. 6 is a plan view similar to FIG. 2, showing another configuration of conveyor belt and drive holes, in accordance with the invention.

The center-to-center spacing of the lanes is selected to correspond to the indexing motion of the tab tooling, so the strip of tabs can stop, properly aligned, over a shell in each lane at the tab transfer/stake stations (see FIGS. 6, 10 and 11 in U.S. Pat. No. 4,568,230). As a result, apertures 32 are aligned with each other in a direction transverse to the longitudinal direction of the lanes I, II and III, and path of motion of the belt 26 such that the apertures 32 define oblique rows, designated A, B, C, D, across the width of the belt 26. Further, the lanes of apertures 32 are staggered relative to each other in the longitudinal direction of the belt such that the aperture rows A, B, C, etc. are aligned at an oblique angle relative to a normal line transverse to the belt center line and, in the embodiment illustrated in FIG. 2, that oblique angle is approximately 17°.

As will be apparent, the longitudinal location of apertures 32 is selected in accordance with the station placement of the tooling, and is such that a tab strip may be conveyed transversely over the belt 26 at the transfer/stake stations, and each incremental advancement of the belt 26 will position an entire one of the rows A, B, C, . . . in overlapping relationship with the tab strip, whereby tabs carried by the strip may be simultaneously attached to the shells positioned in one row.

The conveyor belt 26 of the above-described embodiment further includes circular drive holes 40 extending in first and second longitudinal lanes. One lane of holes 40 is located equidistant from each of carrier aperture lanes I and II, and the other lane of holes 40 is located equidistant from each of carrier aperture lanes II and III. The drive holes 40 are uniformly spaced apart and are spaced apart a distance at least as great as the center-to-center distance between adjacent carrier apertures 32. Preferably the drive holes 40 as shown are spaced apart a distance equal to twice the distance between the centers of adjacent carrier apertures 32 in the longitudinal direction. In addition, the lanes of holes 40 are staggered relative to each other in a manner similar to that of the lanes of carrier apertures 32, such that the holes 40 are aligned with each other at an oblique angle to a line normal to the longitudinal axis or centerline of conveyor belt 26, at an angle parallel to that of the rows A, B, C . . . of carrier apertures 32.

By so locating drive holes 40 between the placement of apertures 32, the holes 40 are strategically positioned in regions where an optimum area of belt material surrounds each hole 40 to minimize the creation of higher stress points in the belt 26. The stress in the belt 26 is further minimized by positioning the holes 40 along oblique lines so no two holes 40 lie on a normal line transverse of the belt 26, thus avoiding propagation of stresses directly across the belt between holes 40 as the belt 26 flexes transversely as it passes around the drive and idler drums.

FIG. 6 illustrates a second embodiment of the belt of the present invention in which a conveyor belt 26' includes two lanes or lanes of carrier apertures 32', designated I and II, wherein the apertures 32' are equally spaced along the length of the belt 26'. It should be noted that the belt 26' is designed to substantially the same width as the belt 26 of FIG. 2, however, the apertures 32' are formed with a larger diameter than the apertures 32, such as may be required to receive shells to form can ends for food containers.

The lanes of apertures 32' are staggered relative to each other such that the apertures form oblique rows A, B, C, D, transverse to the longitudinal center line of the belt 26'. In this embodiment, the result is that rows A, B, C, . . . are aligned at approximately 13° relative to a line transverse to the center line of the belt 26', since the apertures are larger, and their center-to-center spacing along the belt is closer together.

The belt 26' further includes first and second longitudinal lanes of uniformly spaced drive holes 40' located between either longitudinal edge of the belt 26' and the lanes of apertures 32'. In the preferred form of this embodiment, the holes 40'are shown spaced apart a distance in the longitudinal direction substantially equal to twice the spacing between adjacent apertures 32'. Further, the lanes of holes 40' are staggered relative to each other an amount equal to the staggered displacement of the lanes of apertures 32' whereby the holes 40' are configured in a manner similar to the holes 40 of the embodiment of FIG. 2.

Figure 3:
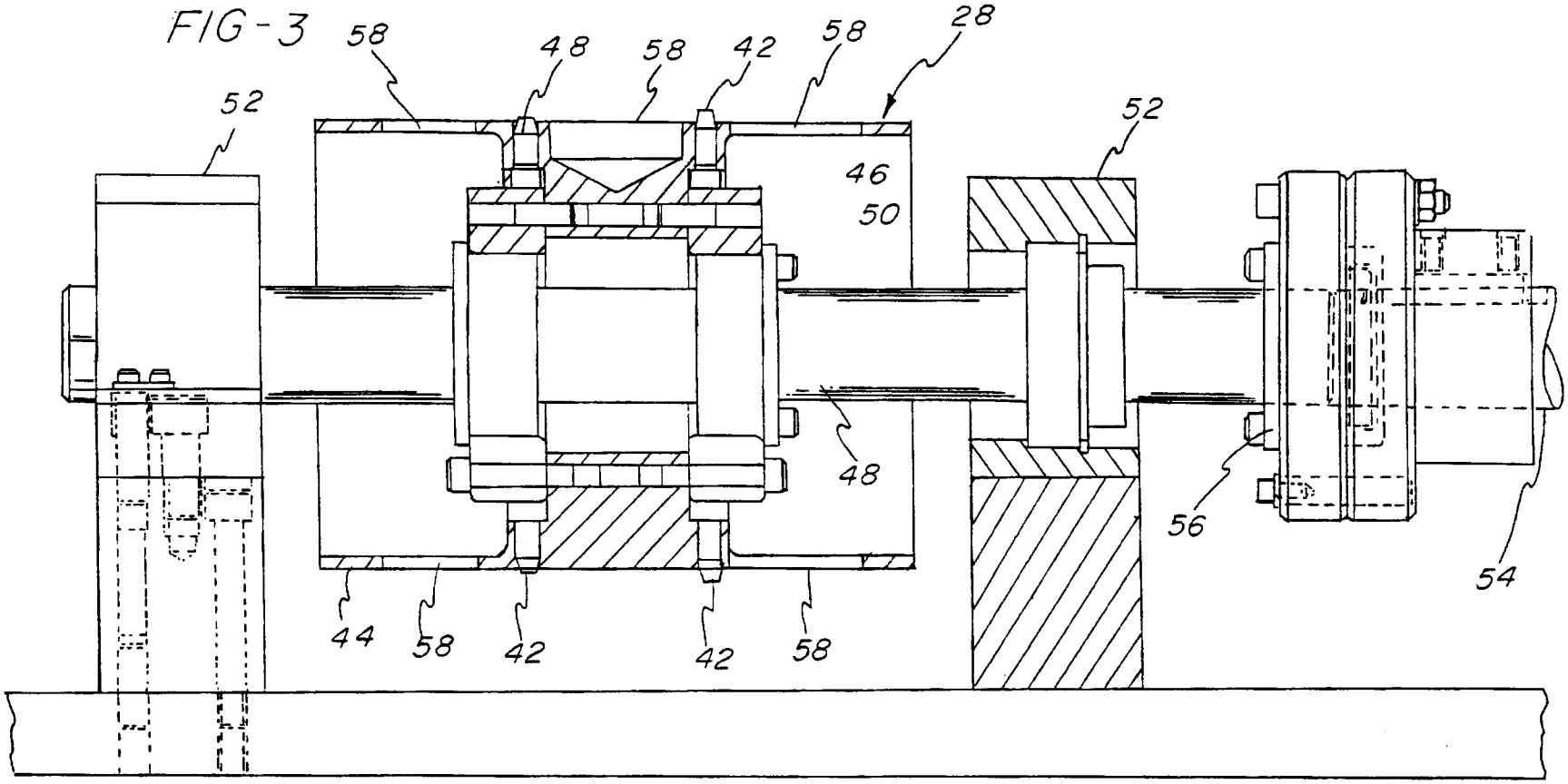
FIG. 3 is a section view taken longitudinally of the drive drum.
Figure 4:
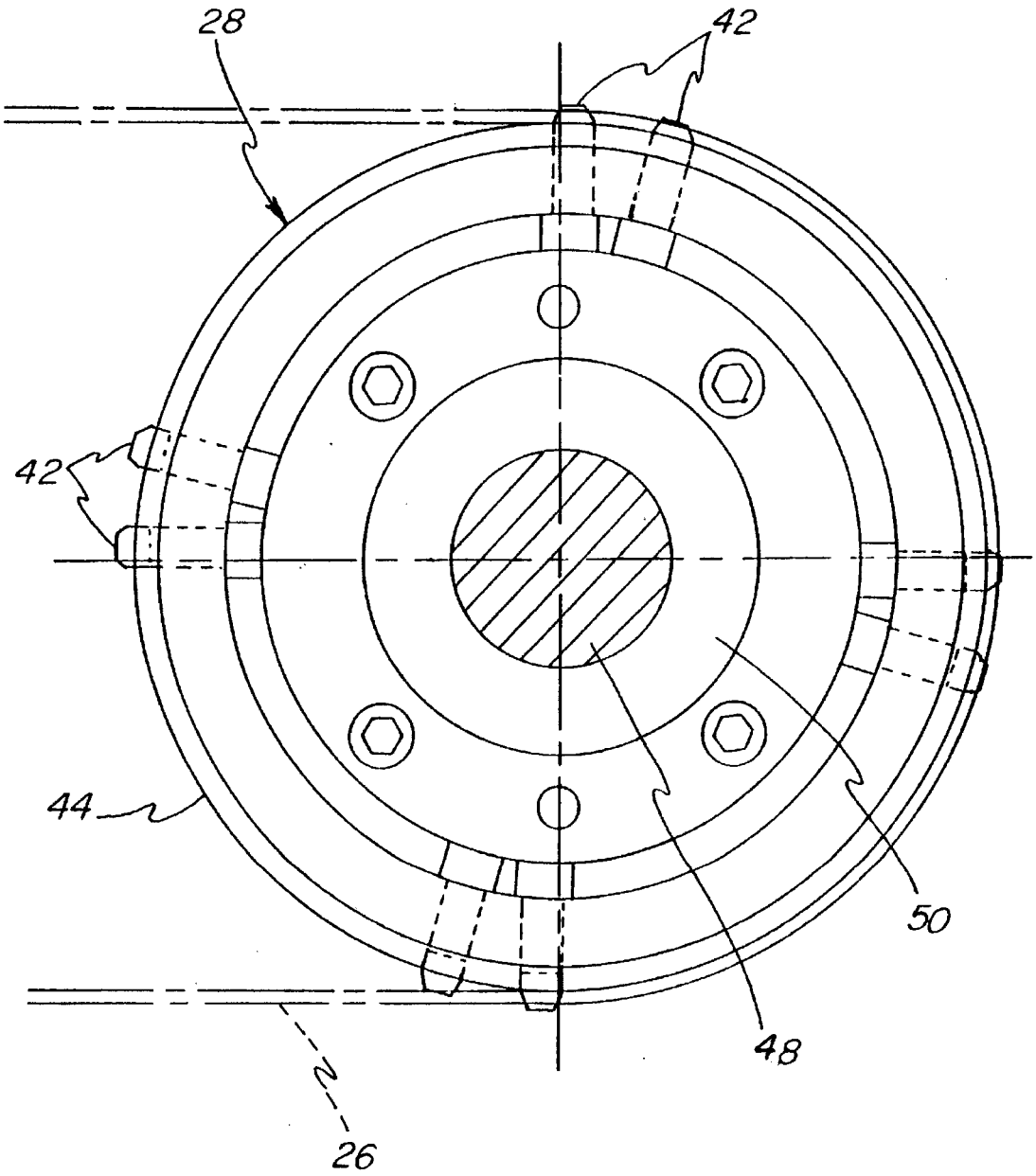
FIG. 4 is a side view of the drive drum with the supporting drive shaft in cross-section and a portion of the belt shown in phantom.

As may be seen in FIGS. 3 and 4, the drive drum 28 includes drive pins 42 for engaging within the drive holes 40, 40' of the conveyor belt 26, 26'. The drive pins 42 are preferably arranged in first and second circumferential rows around the drive drum 28 with each row containing four pins 42 spaced at intervals of 90° around the drum 28. The pins in the first row are angularly displaced about the circumference of the drive drum 28 relative to the pins 42 in the second row such that the pins 42 in the first and second rows of pins 42 are aligned transversely across the face of the drive drum 28 at an oblique angle relative to the rotational axis of the drum 28. In the preferred embodiment, each of the pins 42 in the first row is angularly displaced from at least one of the pins 42 in the second row by an angle of less than 45° and preferably by an angle of 17° for the belt 26 of the embodiment of FIG. 2 and an angle of 13° for the belt 26' of the embodiment of FIG. 6. Thus, the pins 42 are positioned about the circumference of the drum 28 in locations which match the array of drive holes 40, 40' in the conveyor belts 26, 26'. As may be seen in FIG. 3, drive drum 28 includes an outer rim 44 which contacts and supports the conveyor belt 26 or 26' and a hub portion 46 which is connected to a drive shaft 48 by means of a conventional collet coupling 50. The drive shaft 48 is supported for rotation by a pair of supports 52 (with appropriate bearings) located on either side of the drive drum 28 and is connected through a conventional coupling 56 to output shaft 54 of a conventional intermittent right-angle drive, such as described in said U.S. Pat. No. 4,568,230. The drive train ratio from the press drive through the intermitter, together with the diameter of the drive drum, are selected such that one complete revolution of the press crankshaft produces a predetermined fraction of a revolution of drum 28 which in turn produces a linear displacement or feed motion of belt 26 or 26' equal to the longitudinal center-to-center spacing of apertures in the same lane. In the embodiment illustrated in FIGS. 2, 3 and 4, this results in one-eighth revolution of drive drum 28 for each crankshaft revolution.

The drum 28 is further provided with clearance apertures 58 formed in the rim 44 wherein the location of the clearance apertures 58 corresponds to the location of the carrier apertures 32, 32' as they travel around the drum 28 such that clearance is provided for shells to extend through the rim 44 of the drum 28 when they are resting in the conveyor belt 26, 26'. In the absence of an upstacker mechanism, converted shells will remain in the conveyor belts until the belt flexes downwardly around drive drum 28, at which time clearance apertures 58 (FIG. 3) accept any portion of shells projecting through and below belt 26. As shells move around and down over the end of the conveyor, they are propelled across appropriate bridging plates (not shown) and onto suitable take away conveyors.

Figure 5:
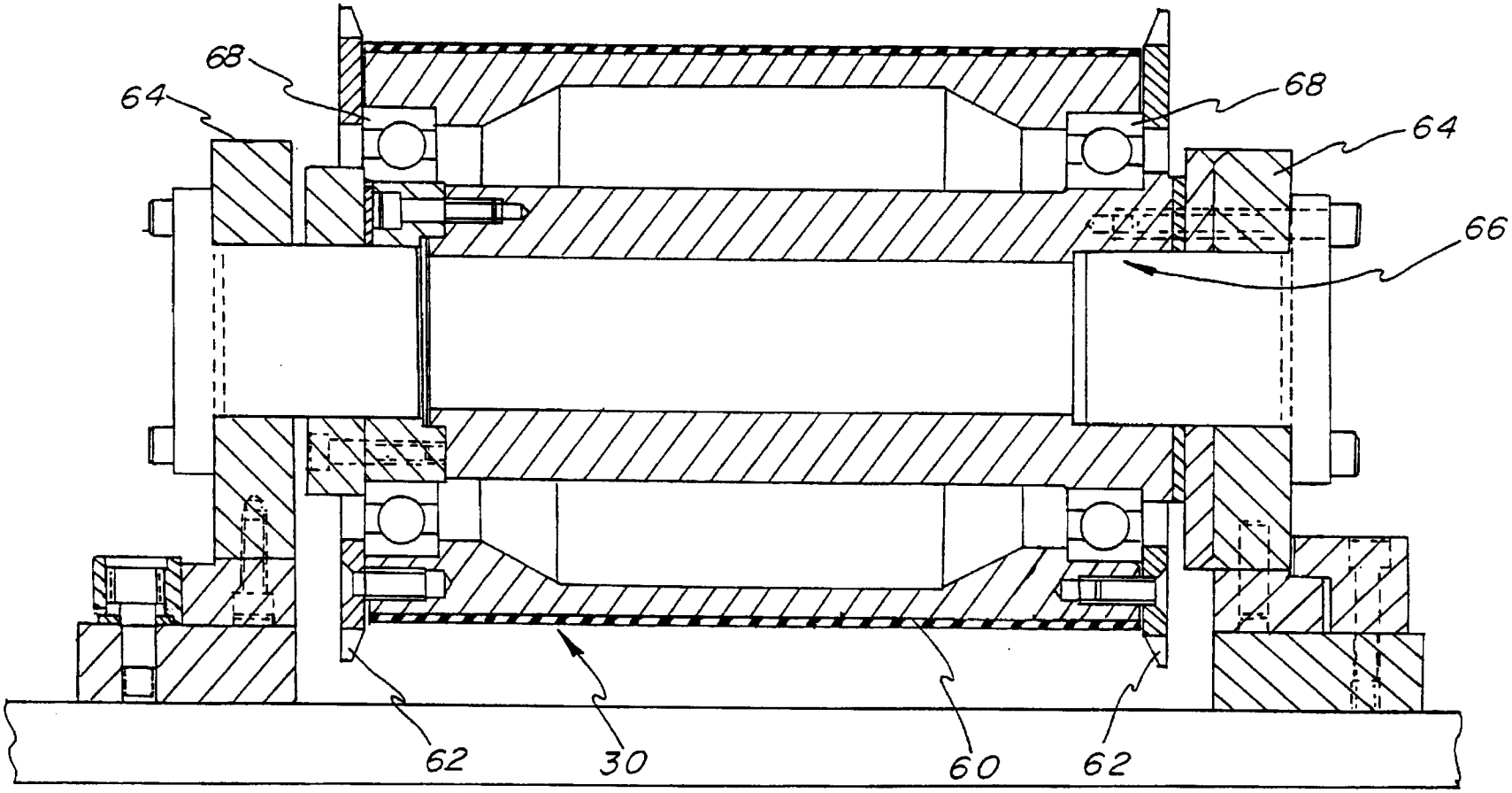
FIG. 5 is a cross-section view taken longitudinally of the follower drum and its supporting structure, with the support shaft shown in elevation.

A follower drum 30 supports the conveyor belt 26, 26' at the opposite end from the drive drum 28 and, as may be seen in FIG. 5, includes an outer rubber facing 60 for contacting and supporting the conveyor belt 26, 26' and end caps 62 located on either end of the follower drum 30. The end caps 62 are provided with radially extending sides which are angled inwardly toward the center of the follower drum 30 in order to facilitate locating the conveyor belt 26, 26' on the rubber facing 60 of the follower drum 30. The follower drum 30 is supported for rotation by conventional support members 64 located on either side of the drum 30 which support a hub assembly 66 including bearings 68 for rotatably mounting the drum 30.

By way of specific examples, in the embodiment of FIG. 2, a drive drum having a diameter of approximately 7.7 inches (19.7 cm) is provided for driving a 10 inch wide conveyor belt 26. The conveyor belt 26 is provided with shell carrier apertures 32 having a diameter of approximately 2.28 inches (5.79 cm) and pin-receiving holes 40 having a diameter of approximately 0.38 inch (0.97 cm). The first and second lanes of drive holes 40 are spaced substantially equidistantly from adjacent pairs of aperture lanes. In addition, the carrier apertures 32 have an on center spacing in the longitudinal direction of approximately 3.0 inches (7.62 cm) and the holes 40 are spaced apart approximately 6.0 inches (15.24 cm). Thus, each drive hole 40 will be engaged with a respective drive pin 42 for at least two successive increments of the drive drum 28.

In the embodiment of FIG. 6, a drive drum having a diameter of approximately 8.9 inches (22.6 cm) is provided for driving a 10 inch wide conveyor belt 26'. The conveyor belt 26' includes carrier apertures 32' having approximately 2.9 inch (7.37 cm) diameter which are spaced longitudinally 3.5 inches (8.89 cm) center-to-center. The holes 40' have an on-center spacing of approximately 7.0 inches (17.8 cm) and are spaced inwardly from either edge of the belt 26' approximately 0.7 inch (1.78 cm). Further, the holes 40' have a diameter of approximately 0.38 inch (0.97 cm) to receive the round (parabolic shaped) nosed pins 42 on the drive drum 28.

The belts 26, 26' of the embodiments depicted in FIGS. 2 and 6 are provided with only a minimum number of drive holes 40, 40' necessary for assuring that the needed force is applied through the drive pins 42 to intermittently accelerate and decelerate the belt 26, 26'. Further, the diameter of the drum 28 is selected and the drive pins 42 are positioned such that there is continuous engagement of at least two pins 42 with a hole 40, 40' in each side of the conveyor belt 26, 26'.

As is apparent from the above description, the design of the conveyor belt and drive structure of the present invention includes drive pin receiving holes which are spaced relatively widely apart such that the number of locations at which the belt is subjected to stresses resulting from engagement with the drive pins is minimized. Further, by providing holes having a circular shape which located between the shell carrying apertures, as equidistant from the edges of such apertures as is possible, the stresses exerted on the belt by the drive pins are distributed more evenly and over a larger portion of the belt area than in prior conveyor belt designs using closely spaced rectangular holes along the belt edges. Thus, the present conveyor belt and drive structure reduces the concentration of stresses in the belt, thereby reducing the likelihood of occurrence of stress failure.

While the forms of apparatus herein described constitutes preferred embodiments of the invention, it is to be understood that the invention is not limited to these precise forms of apparatus and that changes may be made therein without departing from the scope of the invention which is defined in the appended claims.

What is claimed is:

1. In a press for performing operations on shells for can ends and the like, said press having a bed and a slide, drive means connected to said slide to reciprocate said slide toward and away from said bed, upper and lower tooling supported on said slide and said bed, respectively, to perform operations on shells conveyed through said press between said tooling, an endless conveyor belt having an upper flight thereof positioned between said upper and lower tooling, said conveyor belt including means defining a plurality of transversely and longitudinally spaced shell receiving carrier apertures arranged in parallel lanes along said conveyor belt and means connecting said conveyor belt to said drive means for intermittent movement thereof, whereby said conveyor belt may intermittently convey shells between said tooling;

the improvement wherein the means for connecting said belt to said drive means comprises:

a drive drum having a plurality of circumferentially spaced radially extending drive pins, said drive drum being positioned for supporting said conveyor belt;

means for intermittently rotating said drum and driving said belt in synchronism with said drive means; and means defining at least two lanes of drive holes in said conveyor belt smaller than said carrier apertures, said holes being adapted to receive said drive pins as said drive drum is rotated and wherein the center-to-center spacing between successive said holes in a longitudinal direction of said conveyor belt is at least as great as the center-to-center spacing along said belt between successive said carrier apertures, wherein each said hole is located on a different line extending normal to the longitudinal center line of said conveyor belt.

2. An apparatus as defined in claim 1 wherein said holes are positioned in spaced apart parallel lanes extending longitudinally along said belt and spaced laterally of the belt from the center lines of the lanes of carrier apertures.

3. An apparatus as defined in claim 2 wherein said lanes of holes are staggered longitudinally relative to each other whereby said holes are aligned in rows across said conveyor belt at an oblique angle to a normal line extending transversely of the longitudinal center line of said conveyor belt.

4. An apparatus as defined in claim 2 wherein said lanes of carrier apertures are located between said lanes of holes.

5. An apparatus as defined in claim 2 wherein said lanes of holes are located between said lanes of carrier apertures.

6. An apparatus as defined in claim 5 including at least one lane of carrier apertures extending between said lanes of holes.

7. An apparatus as defined in claim 1 wherein an outer longitudinal lane of said carrier apertures is arranged along each edge of said conveyor belt and said holes are positioned between said longitudinal lanes of apertures.

8. An apparatus as defined in claim 7 wherein at least two longitudinal lanes of said holes are located between said outer lanes of carrier apertures.

9. An apparatus as defined in claim 8 wherein an additional lane of carrier apertures is arranged in a single inner longitudinal lane positioned between said lanes of holes.

10. An apparatus as defined in claim 9 wherein said carrier apertures are aligned in rows extending transversely at an oblique angle relative to a line extending normal to a longitudinal edge of said conveyor belt.

11. An apparatus as defined in claim 1 wherein the center-to-center spacing between adjacent ones of said holes in the longitudinal direction of said conveyor belt is substantially twice the center-to-center spacing between adjacent ones of said carrier apertures along said belt.

12. An apparatus as defined in claim 1 wherein said drive drum pins are located in first and second circumferentially oriented rows spaced from each other along the rotational axis of said drum and said pins in said first row are angularly displaced about the circumference of said drive drum relative to the pins in said second row such that the pins in said first and second rows are aligned transversely across the face of said drive drum at an oblique angle relative to the rotational axis of said drum.

13. An apparatus as defined in claim 12 wherein each of said pins in said first row is angularly displaced from at least one of said pins in said second row by an angle of less than 45°.

14. An apparatus as defined in claim 1 wherein said pins are spaced from adjacent pins in the same row a circumferential distance substantially equal to twice the center-to-center spacing between adjacent ones of said apertures in the longitudinal direction.

15. An apparatus as defined in claim 1 wherein said holes are circular.

16. An apparatus as defined in claim 1 further including a follower drum having a support surface for supporting said conveyor belt, and radially extending end caps for directing said conveyor belt onto said support surface.

17. In a press for performing operations on shells for can ends and the like, said press having a bed, a slide, a drive means for reciprocating said slide toward and away from said bed, a set of cooperating progressive tooling supported on said slide and said bed, respectively, to close and open in performing a succession of operations on shells conveyed through said press, an endless conveyor belt having an upper flight thereof positioned between said tooling, a plurality of transversely and longitudinally spaced shell receiving carrier apertures arranged in parallel lanes along said conveyor belt, said apertures being arranged in oblique alignment across said belt, and means for driving said conveyor belt in intermittent steps synchronized with said drive means whereby said conveyor belt moves the shells progressively through said tooling;

the improvement wherein the means for driving said belt comprises:

a drive drum having a plurality of circumferentially spaced radially extending rounded drive pins, said drive drum being positioned for supporting said conveyor belt;

means for intermittently rotating said drum and driving said belt in synchronism with said drive means; and means defining at least two lanes of drive holes in said conveyor belt smaller than said carrier apertures, said holes being shaped to receive said drive pins as said drive drum is rotated and wherein the center-to-center spacing between successive said holes in a longitudinal direction of said conveyor belt is at least twice as great as the center-to-center spacing along said belt between successive said carrier apertures and wherein each said hole is located on a different line extending normal to the longitudinal center line of the conveyor belt.

18. In a press for performing operations on shells for can ends and the like, said press having a bed, a slide, a drive means for reciprocating said slide toward and away from said bed, a set of cooperating progressive tooling supported on said slide and said bed, respectively, to close and open in performing a succession of operations on shells conveyed through said press, an endless conveyor belt having an upper level thereof positioned between said tooling, a plurality of transversely and longitudinally spaced shell receiving carrier apertures arranged in parallel lanes along said conveyor belt, said apertures being arranged in oblique alignment across said belt thereby defining belt regions *generally* between *adjacent* carrier apertures [and the edges of said belt] which regions are displaced longitudinally of the belt from each other so said regions are non-aligned [transversely] *normally* of said belt, and means for driving said conveyor belt in intermittent steps synchronized with said drive means whereby said conveyor belt moves the shells progressively through said tooling;

the improvement wherein the means for driving said belt comprises:

a drive drum having a plurality of circumferentially spaced outwardly extending drive pins, said drive drum being positioned for supporting said conveyor belt;

means for intermittently rotating said drum and driving said belt in synchronism with said drive means; and means defining at least two lanes of drive holes in said conveyor belt smaller than said carrier apertures and shaped to receive said drive pins as said drive drum is rotated, said drive holes being substantially centrally located within said belt regions to surround said drive holes with the optimum amount of belt material and being obliquely aligned transversely of said belt.

*19. An improved conveyor belt for a container end conversion press for performing operations on can end shells,*

*the conveyor belt having a plurality of transversely and longitudinally spaced carrier apertures arranged in parallel lanes along said conveyor belt, said apertures also being arranged in oblique alignment across said belt thereby defining belt regions generally between adjacent carrier apertures which regions are displaced longitudinally of the belt from each other so said regions are non-aligned normally of said belt,*

*means defining drive holes in said conveyor belt smaller than said carrier apertures and shaped to receive drive pins on an intermittently rotated drive drum, and*

*said drive holes being substantially centrally located within said belt regions and surrounded with the optimum amount of belt material.*

*20. The conveyor belt of claim 19 wherein said holes are positioned in spaced apart parallel lanes extending longitudinally along said belt and spaced laterally of the belt from the center lines of the lanes of carrier apertures.*

*21. The conveyor belt of claim 20 wherein said lanes of holes are staggered longitudinally relative to each other whereby said holes are aligned in rows across said conveyor belt at an oblique angle to a normal line extending transversely of the longitudinal center line of said conveyor belt.*

*22. The conveyor belt of claim 20 wherein said lanes of carrier apertures are located between said lanes of holes.*

*23. The conveyor belt of claim 20 wherein said lanes of holes are located between said lanes of carrier apertures.*

*24. The conveyor belt of claim 23 including at least one lane of carrier apertures extending between said lanes of holes.*

*25. The conveyor belt of claim 19 wherein an outer longitudinal lane of said carrier apertures is arranged along each edge of said conveyor belt and said holes are positioned between said longitudinal lanes of apertures.*

*26. The conveyor belt of claim 25 wherein at least two longitudinal lanes of said holes are located between said outer lanes of carrier apertures.*

*27. The conveyor belt of claim 26 wherein an additional lane of carrier apertures is arranged in a single inner longitudinal lane positioned between said lanes of holes.*

*28. The conveyor belt of claim 27 wherein said carrier apertures are aligned in rows extending transversely at an oblique angle relative to a line extending normal to a longitudinal edge of said conveyor belt.*

*29. The conveyor belt of claim 19 wherein the center-to-center spacing between adjacent ones of said holes in the longitudinal direction of said conveyor belt is substantially twice the center-to-center spacing between adjacent ones of said carrier apertures along said belt.*

*30. The conveyor belt of claim 19 wherein said holes are circular.*

*31. An improved conveyor belt for a container end conversion press for performing operations on can end shells,*

*the conveyor belt having a plurality of transversely and longitudinally spaced carrier apertures arranged in parallel lanes along said conveyor belt, said apertures also being arranged in oblique alignment across said belt thereby defining belt regions generally between adjacent carrier apertures which regions are displaced longitudinally of the belt from each other so said regions are non-aligned normally of said belt,*

*means defining drive holes in said conveyor belt smaller than said carrier apertures and shaped to receive drive pins on an intermittently rotated drive drum, and*

*said drive holes being substantially centrally located within said belt regions in a manner to avoid alignment of said drive holes normally of said belt.*

*32. The conveyor belt of claim 31 wherein said holes are positioned in spaced apart parallel lanes extending longitudinally along said belt and spaced laterally of the belt from the center lines of the lanes of carrier apertures.*

*33. The conveyor belt of claim 32 wherein said lanes of holes are staggered longitudinally relative to each other whereby said holes are aligned in rows across said conveyor belt at an oblique angle to a normal line extending transversely of the longitudinal center line of said conveyor belt.*

*34. The conveyor belt of claim 32 wherein said lanes of carrier apertures are located between said lanes of holes.*

*35. The conveyor belt of claim 32 wherein said lanes of holes are located between said lanes of carrier apertures.*

*36. The conveyor belt of claim 35 including at least one lane of carrier apertures extending between said lanes of holes.*

*37. The conveyor belt of claim 31 wherein an outer longitudinal lane of said carrier apertures is arranged along each edge of said conveyor belt and said holes are positioned between said longitudinal lanes of apertures.*

*38. The conveyor belt of claim 37 wherein at least two longitudinal lanes of said holes are located between said outer lanes of carrier apertures.*

*39. The conveyor belt of claim 38 wherein an additional lane of carrier apertures is arranged in a single inner longitudinal lane positioned between said lanes of holes.*

*40. The conveyor belt of claim 39 wherein said carrier apertures are aligned in rows extending transversely at an oblique angle relative to a line extending normal to a longitudinal edge of said conveyor belt.*

*41. The conveyor belt of claim 31 wherein the center-to-center spacing between adjacent ones of said holes in the longitudinal direction of said conveyor belt is substantially twice the center-to-center spacing between adjacent ones of said carrier apertures along said belt.*

*42. The conveyor belt of claim 31 wherein said holes are circular.*

*43. An improved endless conveyor belt for a container end conversion press including means defining a plurality of transversely and longitudinally spaced shell receiving carrier apertures arranged in parallel lanes along said conveyor belt and means defining at least two lanes of drive holes in said conveyor belt smaller than said carrier apertures, said holes being adapted to receive drive pins of a drive drum of said press as said drive drum is rotated and wherein the center-to-center spacing between successive said holes in a longitudinal direction of said conveyor belt is at least as great as the center-to-center spacing along said belt between successive said carrier apertures wherein each said hole is located on a different line extending normal to the longitudinal center line of said conveyor belt.*

*44. The conveyor belt of claim 43 wherein said holes are positioned in spaced apart parallel lanes extending longi-*

*tudinally along said belt and spaced laterally of the belt from the center lines of the lanes of carrier apertures.*

*45. The conveyor belt of claim 44 wherein said lanes of holes are staggered longitudinally relative to each other whereby said holes are aligned in rows across said conveyor belt at an oblique angle to a normal line extending transversely of the longitudinal center line of said conveyor belt.*

*46. The conveyor belt of claim 44 wherein said lanes of carrier apertures are located between said lanes of holes.*

*47. The conveyor belt of claim 44 wherein said lanes of holes are locked between said lanes of carrier apertures.*

*48. The conveyor belt of claim 47 including at least one lane of carrier apertures extending between said lanes of holes.*

*49. The conveyor belt of claim 43 wherein an outer longitudinal lane of said carrier apertures is arranged along each edge of said conveyor belt and said holes are positioned between said longitudinal lanes of apertures.*

*50. The conveyor belt of claim 49 wherein at least two longitudinal lanes of said holes are located between said outer lanes of carrier apertures.*

*51. The conveyor belt of claim 50 wherein an additional lane of carrier apertures is arranged in a single inner longitudinal lane positioned between said lanes of holes.*

*52. The conveyor belt of claim 51 wherein said carrier apertures are aligned in rows extending transversely at an oblique angle relative to a line extending normal to a longitudinal edge of said conveyor belt.*

*53. The conveyor belt of claim 43 wherein the center-to-center spacing between adjacent ones of said holes in the longitudinal direction of said conveyor belt is substantially twice the center-to-center spacing between adjacent ones of said carrier apertures along said belt.*

*54. The conveyor belt of claim 43 wherein said holes are circular.*

* * * * *

UNITED STATES PATENT AND TRADEMARK OFFICE

CERTIFICATE OF CORRECTION

PATENT NO. : RE 35,530
DATED : June 10, 1997
INVENTOR(S) : George D. Hunt

It is certified that error appears in the above-indentified patent and that said Letters Patent is hereby corrected as shown below:

Col. 7, line 17, start a new paragraph with "As may be seen in FIG. 3".

Col. 8, line 37, after "which" insert -- are -- .

Col. 13, line 11, "locked" should be -- located -- .

Signed and Sealed this

Third Day of February, 1998

*Attest:*

Bruce Lehman

BRUCE LEHMAN

*Attesting Officer*

*Commissioner of Patents and Trademarks*